3,541,110
Patented Nov. 17, 1970

3,541,110
INDAZOLE-5-SULFONAMIDES
Stanley C. Bell, Narberth, and Carl Gochman, Philadelphia, Pa., assignors to American Home Products Corporation, New York, N.Y., a corporation of Delaware
No Drawing. Filed Jan. 20, 1967, Ser. No. 610,471
Int. Cl. C07d 49/18
U.S. Cl. 260—310                                4 Claims

ABSTRACT OF THE DISCLOSURE 3-(2-amino-5-halo-, 5-alkyl- and 5-alkoxyphenyl)-indazole-5-sulfonamides, tautomers and acylamino derivatives thereof (Ia and Ib) are obtained by a process comprising treating a 3-(2-amino-5-halo-, 5-alkyl- or 5-alkoxybenzoyl)-4-chlorobenzenesulfonamide with hydrazine and, when required, alkanoylating the reaction product. Compounds Ia and Ib have central nervous system activity and are useful as central nervous system depressants, especially as antinauseants, sedatives, tranquilizers and anticonvulsants; additionally, they possess antiinflammatory utility.

This invention relates to substituted indazole-5-sulfonamides. More particularly, it relates to 3-(2-amino-5-chlorophenyl)-indazole - 5-sulfonamides and tautomeric forms and derivatives thereof. The instant compounds have depressant and anti-inflammatory properties.

The compounds comprehended by this invention are selected from those of Formulae Ia and Ib:

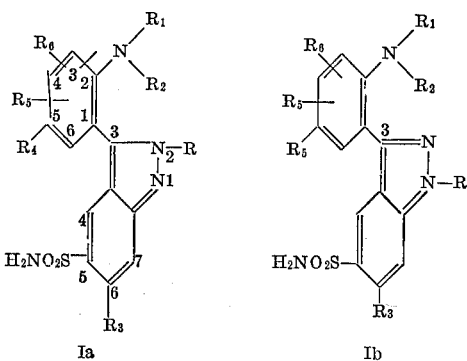

wherein:

R is hydrogen or alkanoyl;
$R_1$ and $R_2$ are hydrogen, alkanoyl, or alkyl; and
$R_3$, $R_4$, $R_5$ and $R_6$ are hydrogen, alkyl, alkoxy or halogen, said alkanoyl, alkyl and alkoxy groups containing up to 6 carbon atoms and said alkanoyl groups being unsubstituted or substituted with from 1 to 2 chlorine atoms.

When used herein and in the appended claims, "alkyl (or alkoxy) of up to about 6 carbon atoms" includes straight and branched chain hydrocarbon or hydrocarbonoxy radicals, illustrative members of which are: methyl, ethyl, propyl, i-propyl, butyl, i-butyl, t-butyl, n-pentyl, n-hexyl, 3-methylpentyl, 2-ethylbutyl, methoxy, ethoxy, propoxy, i-propoxy, butoxy, i-butoxy, t-butoxy, n-pentoxy, n-hexyloxy, 3-methylpentoxy, 2-ethylbutoxy and the like. The term "alkanoyl of up to 6 carbon atoms, said alkanoyl group being unsubstituted or substituted with from 1 to 2 chlorine atoms" includes formyl groups and those derived from straight and branched chain hydrocarbon— or chlorinated hydrocarbon carboxylic acids, illustrative members of which are acetyl, propionyl, t-butyroyl, n-valeroyl, n-hexanoyl, 2-ethyl-n-butyroyl, monochloroacetyl, dichloroacetyl, 2-chloropropionyl, 2,3-dichloro-n-butyroyl, and the like. "Halogen" includes fluorine, chlorine, bromine and iodine.

Special mention is made of particularly valuable embodiments of this invention. These are 3-(2-amino-5-chlorophenyl) - 2H-indazole-5-sulfonamide, a compound of Formula Ia wherein R, $R_1$, $R_2$ and $R_3$ are hydrogen; 2-acetyl - 3-(5-chloro-2-diacetylaminophenyl)-2H-indazole-5-sulfonamide, a compound of Formula I wherein R, $R_1$ and $R_2$ are acetyl and $R_3$ is hydrogen; and 3-(2-acetylamino - 5 - chlorophenyl)-2H-indazole-5-sulfonamide, a compound of Formula I wherein R and $R_1$ are hydrogen, $R_2$ is acetyl and $R_3$ is hydrogen. These compounds exert useful depressant and anti-inflammatory activity in warm blooded mammals.

As will be obvious to those skilled in the art, compounds of this invention can exist in tautomeric forms and even as mixtures of tautomers. For example the compound 3-(2 - amino - 5-chlorophenyl)-2H-indazole-5-sulfonamide (Ic) can be depicted with its tautomer 3-(2-amino-5-chlorophenyl)-1H-indazole-5-sulfonamide (Id), as follows:

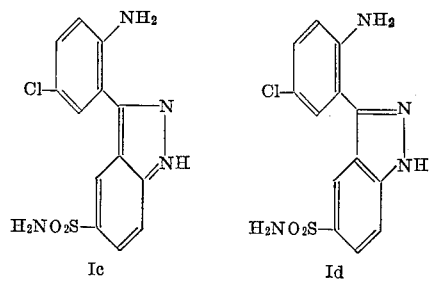

All of the tautomeric forms of the derivatives included in this invention are useful for the purposes set forth hereinabove.

The compounds of this invention can be obtained in a number of ways. One especially convenient means to obtain the new compounds of Formulae Ia and Ib:

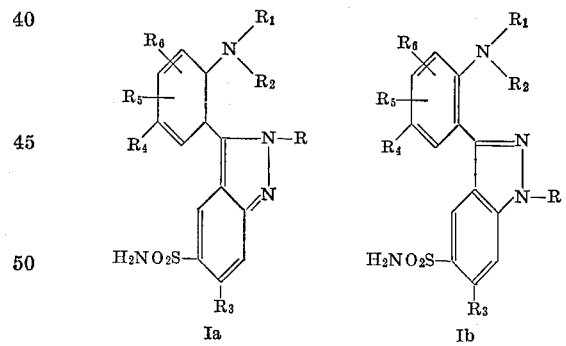

wherein R, $R_1$, $R_2$, $R_3$, $R_4$, $R_5$ and $R_6$ are as above defined is a process comprising, in essence, treating a compound of Formula II:

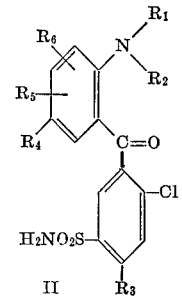

wherein $R_1$ and $R_2$ are hydrogen, unsubstituted alkanoyl or alkyl and $R_3$, $R_4$, $R_5$ and $R_6$ are as defined in Formula Ia and Ib, with hydrazine until formation of an indazole of Formula Ie:

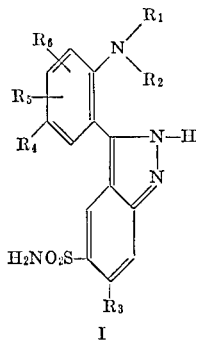

or a tautomer thereof, wherein $R_1$ and $R_2$ are hydrogen, unsubstituted alkanoyl or alkyl and $R_3$, $R_4$, $R_5$ and $R_6$ are as defined for Formula Ia and Ib, is substantially complete and, when required, treating a compound of Formula Ie, or a tautomer thereof, wherein both, either or neither of the groups $R_1$ and $R_2$ are hydrogen, with an alkanoylating agent of the formula $$Ac_2O \text{ or } Ac=halide$$

wherein "Ac" is alkanoyl of from 2 to 6 carbon atoms and is unsubstituted or is substituted with from 1 to 2 chlorine atoms, and "halide" is chlorine or bromine, or with formic acid.

The benzophenone starting material (II) is obtained by treating a readily available, appropriately-substituted amino-chlorobenzophenone with chlorosulfonic acid, then with ammonia, in a procedure fully described hereinafter.

The substituted 3 - (2 - amino-5-halo-, 5-alkyl- or 5-alkoxy-phenyl)-2H-indazole - 5 - sulfonamide Ie is obtained by heating a mixture of compound II and hydrazine until condensation is substantially complete, then recovering the product. Either anhydrous hydrazine or hydrazine hydrate can be used. Hydrazine hydrate containing up to about 20% by weight of water is satisfactory. Since the condensation proceeds by the elimination of acid, at least two equimolar amounts of hydrazine are conveniently employed, based on compound II, one of which acts as an acid binding agent. It is noteworthy that only the chlorine ortho to the benzoyl group reacts. The reaction conditions are not particularly critical; heating may be carried out at a temperature of from about 60° C. to about 100° C. for from about 5 to about 30 hours; cooling the mixture to about 25° C. and diluting it with about twice its volume of an equal volume mixture of ethanol and water causes precipitation of the product (Ie) in solid form; and it can be removed by filtration.

The mono-acetylation of the amino nitrogen in compound Ie ($R_1$, $R_2$=H) to give the monoacylamino compound Ie ($R_1$=H, $R_2$=Ac) is carried out under mild, selective conditions, which leave the indazole nitrogen unacetylated. Thus compound Ie ($R_1$, $R_2$=H$_2$) is suspended in about 20 parts by volume of an inert solvent, such as 1,2-dimethoxyethane, and about 3 parts by weight of an acid anhydride or halide is added. The mixture is warmed slightly, to about 30° C., and then allowed to stand until the reaction is substantially complete; then the product Ie ($R_1$=H, $R_2$=Ac) is filtered off. The formyl derivative is prepared using formic acid instead of the acyl halide or anhydride.

More vigorous conditions are employed to obtain the more highly acetylated compounds, and especially Ia (R, $R_1$ and $R_2$=Ac). Here either compound Ie ($R_1$=H, $R_2$=Ac) or Ie ($R_1$, $R_2$=H) can be used and the reaction is carried out at temperatures of 100° C. and above. If 3-(2-amino-5-chlorophenyl)-5-sulfamoyl - 2H - indazole Ie ($R_1$, $R_2$=H) is used as the starting material, it can be suspended in about 75 parts by weight of acetic anhydride and the mixture heated and refluxed for at least about 10 minutes; cooling the mixture to about 25° C., filtering off a small amount of solid material, then allowing the filtrate to stand, causes precipitation of the product. It can be purified by recrystallization from mixtures of dimethylformamide and water, if desired.

Compounds of Formulas Ia and Ib possess valuable pharmaceutical properties. In particular these new compounds possess central nervous system activity and are useful as central nervous system depressants, especially as antinauseants, sedatives, tranqualizers and anticonvulsants. In addition, they are antiinflammatory agents, and because of this property they are of importance in the treatment of arthritic and dermatological disorders and of like conditions which respond to treatment with antiinflammatory agents.

When used for the purposes illustrated above, it may be desirable according to conventional pharmaceutical practice to combine the specific compound selected into compositions suitable for enteral or parenteral administration by formulation with a pharmaceutically acceptable organic or inorganic carrier. The composition may be prepared in solid form, such as tablets or in liquid form such as a solution, suspension or emulsion. Suitable liquid carriers include water, gelatin, lactose, starch, talc, vegetable oils, alcohols, polyalcohols, gums, syrups, and the like. The pharmaecutical composition in addition to the active principle and the carrier may include auxiliary materials such as coloring, stabilizing, wetting or emulsfying agents. It is, of course, to be understood that the carrier as well as any other materials present with the active principle be inert with respect thereto.

The dosage of the present therapeutic agents will vary with the form of administration and the particular compound selected. Furthermore, the dosage will vary with the particular subject being treated. Generally treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenternally. In general, the compounds of this invention are most desirably administered at a concentration level that will generally afford effective results without causing any harmful or deleterious side effects and preferably at a level that is in the range of from about 40 mg. to about 2000 mg. per day for the adult human, although, as mentioned, variations will occur. However, a dosage level that is in the range of from about 200 mg. to about 1000 mg. per day is most desirably employed to achieve effective results.

The following procedure illustrates the preparation of a material useful as an intermediate to prepare the compound of this invention:

PROCEDURE

3 - (2 - amino - 5 - chlorobenzoyl) - 4 - chlorobenzenesulfonamide (alternative designation, 2-amino-2',5-dichloro-5-sulfamoylbenzophenone)

To 180 ml. of chlorosulfonic acid is added, with stirring and cooling, 92.0 of 2-amino-2',5-dichlorobenzophenone. The reaction mixture is heated on a steam bath for one hour, cooled, decomposed on ice and the resulting yellow solid is filtered. The solid sulfonyl chloride is added to a solution of 350 ml. of ethanol and 250 ml. of conc. ammonium hydroxide and heated on a steam bath for 1.5 hours. The reaction mixture is cooled and the precipitated product collected and washed with an alcohol-water mixture. There is obtained 58 g., M.P., 213–5° C. A sample recrystallized from acetonitrile melts at 216–8° C.

Similarly, if 2-amino-2',5,4'-trichlorobenzophenone is used as a starting material, there is obtained 3-(2-amino-5-chlorobenzoyl) - 4,6 - dichlorobenzenesulfonamide. If 2-monomethylamino - 2',5 - dichlorobenzophenone is used as a starting material, there is obtained 3-(2-monomethylamino-5-chlorobenzoyl) - 4 - chlorobenzenesulfonamide. And if 2-dimethylamino-2',5,4'-trichlorobenzophenone is used as a starting material there is obtained 3-(2-dimethylamino-5-chlorobenzoyl)-4,6-dichlorobenzenesulfonamide.

The following examples show representative products of this invention. They are merely illustrative and are not to be construed to limit the scope of the claims in any manner whatsoever.

EXAMPLE 1

3 - (2 - amino - 5 - chlorophenyl) - 2H - indazole - 5-sulfonamide [alternative designation, 3 - (2 - amino-5-chlorophenyl-5-sulfamoyl-2H-indazole]

A mixture of 10 g. of 2-amino-2',5-dichloro-5'-sulfamoylbenzophenone and 25 ml. of hydrazine hydrate is heated on a steam bath for 18 hours. The reaction mixture is cooled and diluted with 70 ml. of ethanol and 70 ml. of water. There is obtained, by filtering off and drying the solid, 7.0 g. of product, M.P., 263–265° C.

EXAMPLE 2

2 - acetyl - 3 - (5 - chloro - 2 - diacetylaminophenyl)-2H-indazole-5-sulfonamide A mixtuer of 2.0 g. of 3-(2-amino-5-chlorophenyl)-2H-indazole-5-sulfonamide and 150 ml. of acetic anhydride is refluxed for 10 minutes. After allowing the mixture to cool to about 25° C., the mixture is filtered from a yellow solid and on standing, the product, 1.2 g., precipitates out as a white solid. After crystallization from a dimethylformamide-water mixture, the product melts at 222–223° C.

EXAMPLE 3

3 - (2 - acetylamino - 5 - chlorophenyl) - 2H -indazole-5 - sulfonamide [alternative designation, 4'-chloro-2'-(5-sulfamoyl-2H-indazol-3-yl)acetanilide]

To a solution of 3.0 g. of 3-(2-amino-5-chlorophenyl)-2H-indazole-5-sulfonamide in 60 ml. of dimethoxyethane is added 10 ml. of acetic anhydride. The reaction mixture is warmed slightly (to about 30° C.) and allowed to stand. There is obtained after fitration and drying, 3.1 g. of product, M.P., 300° C.

EXAMPLE 4

3-(2-amino-5-chlorophenyl)-6-chloro-2H-indazole-5-sulfonamide 3-(2-amino-5-chlorobenzoyl) - 4,6 - dichlorobenzenesulfonamide is treated with hydrazine according to the procedure of Example 1 and the named product is obtained.

EXAMPLE 5

3-(2-monomethylamino-5-chlorophenyl)-2H-indazole-5-sulfonamide 3-(2-monomethylamino-5-chlorobenzoyl) - 4 - chlorobenzenesulfonamide is treated with hydrazine according to the procedure of Example 1 and the named product is obtained.

EXAMPLE 6

3-(2-dimethylamino-5-chlorophenyl)-6-chloro-2H-indazole-5-sulfonamide 3-(2-dimethylamino-5-chlorobenzoyl) - 4,6 - dichlorobenzenesulfonamide is treated with hydrazine according to the procedure of Example 1 and the named product is obtained.

EXAMPLE 7

3-[2-mono(dichloroacetyl)amino-5-chlorophenyl]-2H-indazole-5-sulfonamide 3-(2-amino-5-chlorophenyl)-2H-indazole - 5 - sulfonamide is treated with dichloroacetyl chloride according to the procedure of Example 3 and the named product is obtained.

EXAMPLE 8

2-(3-chloropropionyl)-3-[5-chloro-2-di-(3-chloro propionyl)aminophenyl]-6-chloro-2H-indazole-5-sulfonamide 3-(2-amino-5-chlorophenyl)-6-chloro - 2H - indazole-5-sulfonamide is treated with 3-chloroponionic anhydride according to the proedure of Example 2 and the named product is obtained.

EXAMPLE 9

3-[2-mono(chloroacetyl)amino-5-chlorophenyl]-2H-indazole-5-sulfonamide

To a solution of 3.0 g. of 3-(2-amino-5-chlorophenyl)-2H-indazole-5-sulfonamide in 60 ml. of dimethoxyethane is added 10 ml. of monochloroacetic anhydride. The reaction mixture is warmed to about 30° C. and allowed to stand for about 8 hours. The product is recovered by filtration and is dried.

EXAMPLE 10

The following appropriately-substituted 3-(2-amino-5-halo-, 5-alkyl- or 5 - alkoxybenzoyl) - 4 - chlorobenzenesulfonamides:

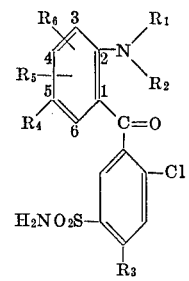

| R₁ | R₂ | R₃ | R₄ | R₅ | R₆ |
|---|---|---|---|---|---|
| CH₃CO | H | H | Cl | H | H |
| H | H | Br | Br | H | H |
| H | H | H | I | H | H |
| H | H | H | F | H | H |
| H | H | H | Cl | 6-Cl | 3-Cl |
| H | H | CH₃ | CH₃ | H | H |
| H | H | CH₂O | Cl | 6-CH₃ | 4-CH₃ |
| H | H | H | CH₃O | H | H |
| H | H | H | Cl | 4-CH₂O | H |
| H | H | F | Cl | H | H |

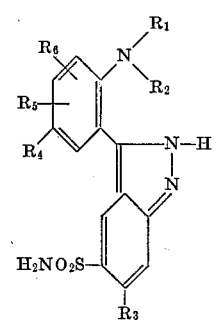

| R₁ | R₂ | R₃ | R₄ | R₅ | R₆ |
|---|---|---|---|---|---|
| CH₃CO | H | H | Cl | H | H |
| H | H | Br | Br | H | H |
| H | H | H | I | H | H |
| H | H | H | F | H | H |
| H | H | H | Cl | 6-Cl | 3-Cl |
| H | H | CH₃ | CH₃ | H | H |
| H | H | CH₃O | Cl | 6-CH₃ | 4-CH₃ |
| H | H | H | CH₃O | H | H |
| H | H | H | Cl | 4-CH₃O | H |
| H | H | F | Cl | H | H | are treated with hydrazine according to the procedure to the procedure of Example 1 and the following indazoles are obtained:

What is claimed is:
1. A compound selected from those of the formulae:

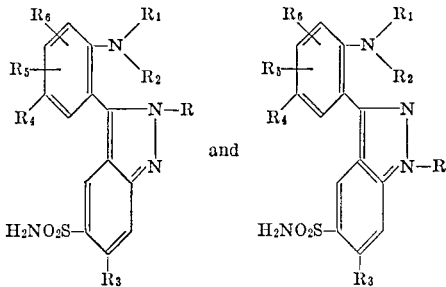

wherein:
R is hydrogen, alkanoyl or alkanoyl substituted with from 1 to 2 chlorine atoms;
$R_1$ and $R_2$ are hydrogen, alkanoyl, alkanoyl substituted with from 1 to 2 chlorine atoms or alkyl; and
$R_3$, $R_4$, $R_5$ and $R_6$ are hydrogen, alkyl, alkoxy or halogen, said alkanoyl, substituted alkanoyl, alkyl and alkoxy groups containing up to 6 carbon atoms.

2. A compound as defined in claim 1, which is 3-(2-amino-5-chlorophenyl)-2H-indazole-5-sulfonamide.

3. A compound as defined in claim 1, which is 2-acetyl-3-(5-chloro-2-diacetylaminophenyl) - 2H - indazole-5-sulfonamide.

4. A compound as defined in claim 1, which is 3-(2-acetylamino-5-chlorophenyl)-2H-indazole-5-sulfonamide.

References Cited

FOREIGN PATENTS 599,834  3/1948  Great Britain.,
400,169  4/1966  Switzerland.

OTHER REFERENCES

Elderfield Hetercyclic Compounds, vol. 5, pp. 163–5, New York, Wiley, 1957.

Noller Chemistry of Organic Compounds, 2nd ed., pp. 161, 450, 451, and 461–3, Philadelphia, Saunders, 1958.

Fieser et al.: Advance Organic Chemistry, p. 626, New York, Reinhold, 1961.

Petitcolas et al.: Chem. Abst., vol. 45, columns 1583–5, (1951).

NATALIE TROUSOF, Primary Examiner

U.S. Cl. X.R.
260—543, 556, 999

PO-1050
(5/69)

UNITED STATES PATENT OFFICE
CERTIFICATE OF CORRECTION

Patent No. 3,541,110      Dated November 17, 1970

Inventor(s) Stanley C. Bell and Carl Gochman

It is certified that error appears in the above-identified patent and that said Letters Patent are hereby corrected as shown below:

In column 1, lines 32-48, in formula Ia the valence bond in the upper benzene ring should be omitted so that the formula should read:

--

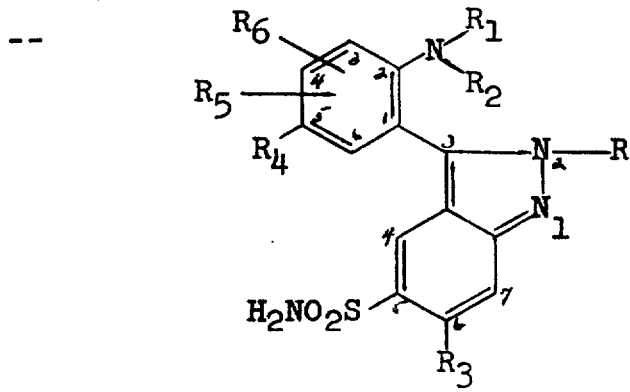

Ia                                              --

In column 1, lines 32-48, in formula Ib, the second $R_5$ on the upper benzene ring should be --$R_4$--, the numeral "3" at the lower right of the upper benzene ring should be omitted and two bonds in the 5-membered ring should be replaced by a single bond so that the formula should read:

--

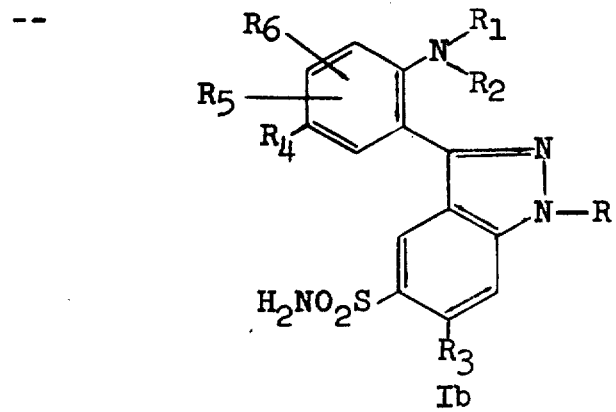

Ib                           -- (cont'd)

UNITED STATES PATENT OFFICE
CERTIFICATE OF CORRECTION

Patent No. 3,541,110      Dated November 17, 1970

Inventor(s) Stanley C. Bell and Carl Gochman    PAGE- 2

It is certified that error appears in the above-identified patent and that said Letters Patent are hereby corrected as shown below:

(Continued-page 2)

In column 3, line 25, should read: -- $Ac_2O$ or Ac-halide --

In column 6, lines 41-50, under "$R_3$" in line 47, "$CH_2O$" should read: -- $CH_3O$ -- and under "$R_5$" in line 48, "4-$CH_2O$" should read: -- 4-$CH_3O$ --.

In column 7, (claim 1) lines 5-19, the two bonds in the 5-member ring of the right hand formula should be replaced by one dou bond at the top so that the formula should read:

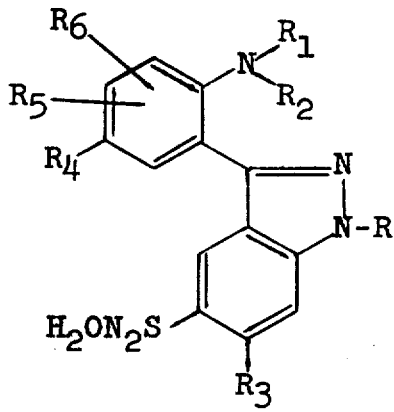

In colum 8, line 15, following "Elderfield" the word "Hetercyclic" should read -- Heterocyclic --.

SIGNED AND
SEALED
MAR 9 1971

(SEAL)
Attest:

Edward M. Fletcher, Jr.
Attesting Officer

WILLIAM E. SCHUYLER,
Commissioner of Pate